United States Patent
Naughton et al.

(10) Patent No.: US 8,328,475 B2
(45) Date of Patent: Dec. 11, 2012

(54) CUTTING TOOL ASSEMBLY INCLUDING A RELEASE MECHANISM

(75) Inventors: Michael Naughton, Dousman, WI (US); Jeffrey M. Wackwitz, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 1050 days.

(21) Appl. No.: 12/324,098

(22) Filed: Nov. 26, 2008

(65) Prior Publication Data

US 2009/0136310 A1    May 28, 2009

Related U.S. Application Data

(60) Provisional application No. 60/990,842, filed on Nov. 28, 2007.

(51) Int. Cl.
*B23B 51/04* (2006.01)
(52) U.S. Cl. .................................. 408/204; 408/239 R
(58) Field of Classification Search .................. 408/204, 408/238, 239 R, 239 A; 279/141, 8, 71, 81, 279/79, 80; 403/343
See application file for complete search history.

(56) References Cited

U.S. PATENT DOCUMENTS

| | | | |
|---|---|---|---|
| 2,667,687 A | | 2/1954 | Clarkson |
| 3,195,934 A | * | 7/1965 | Parrish .......................... 285/312 |
| 3,784,316 A | * | 1/1974 | Bittern .......................... 408/204 |
| 4,010,966 A | | 3/1977 | Vanden Bosch |
| 4,352,511 A | | 10/1982 | Ribble et al. |
| 4,901,479 A | | 2/1990 | Helm |
| 4,911,253 A | | 3/1990 | Cliche |
| 5,108,235 A | | 4/1992 | Czyzewski |
| 5,175,963 A | | 1/1993 | Schafer et al. |
| 5,199,223 A | | 4/1993 | Rudolf et al. |
| 5,352,071 A | | 10/1994 | Cochran et al. |
| 5,352,075 A | | 10/1994 | Stephens |
| 5,658,102 A | | 8/1997 | Gale |
| 5,899,648 A | | 5/1999 | Kanaan et al. |
| 6,120,221 A | | 9/2000 | Alm |
| 6,887,018 B2 | | 5/2005 | Ostermeier |
| 7,175,372 B2 | | 2/2007 | Davis |
| 7,220,091 B2 | | 5/2007 | Takahashi et al. |
| 8,038,371 B2 | * | 10/2011 | Miller et al. ................... 408/204 |
| 2001/0001276 A1 | * | 5/2001 | Chao .............................. 408/204 |
| 2008/0118315 A1 | | 5/2008 | Brunson |
| 2008/0118316 A1 | | 5/2008 | Miller et al. |

FOREIGN PATENT DOCUMENTS

| | | |
|---|---|---|
| DE | 3824040 | 11/1989 |
| DE | 29918965 | 7/2000 |

* cited by examiner

*Primary Examiner* — Daniel Howell
*Assistant Examiner* — Paul M Janeski
(74) *Attorney, Agent, or Firm* — Michael Best & Friedrich LLP

(57) ABSTRACT

An arbor assembly for connecting a cutting tool to a power tool includes a shaft defining a longitudinal axis and having an end portion configured to couple to the cutting tool, and a plate surrounding a portion of the shaft adjacent to the end portion. The plate has a first surface configured to engage the cutting tool when the cutting tool is coupled to the shaft and a second surface substantially opposite the first surface. The plate is movable along the longitudinal axis relative to the shaft. The arbor assembly also includes a wedge member positioned adjacent to the second surface of the plate and defining an opening to receive a portion of the shaft. The wedge member is movable relative to the plate from a first position, in which the plate is inhibited from moving along the longitudinal axis away from the end portion, to a second position, in which the plate is movable along the longitudinal axis away from the end portion.

34 Claims, 13 Drawing Sheets

CUTTING TOOL ASSEMBLY INCLUDING A RELEASE MECHANISM

CROSS-REFERENCE TO RELATED APPLICATIONS

This application claims priority to U.S. Provisional Patent Application No. 60/990,842, entitled "Cutting Tool Assembly Including a Release Mechanism," filed Nov. 28, 2007 by Michael Naughton, the entire contents of which is hereby incorporated by reference.

BACKGROUND

The present invention relates to cutting tool assemblies and, more particularly, to cutting tool assemblies including release mechanisms.

A rotary cutting tool, such as a hole saw, is typically threaded onto a shaft to couple the cutting tool to a power tool, such as a drill. As the power tool rotates the cutting tool to cut a work piece, the cutting tool may tighten or jam onto threading of the shaft such that it is difficult to manually unthread the cutting tool from the shaft. Arbors, or chucks, have been developed to help relieve pressure between the cutting tool and the threading on the shaft. However, these designs typically include many small parts, making the arbors difficult to assemble and susceptible to premature failures.

SUMMARY

In one embodiment, the invention provides an arbor assembly for connecting a cutting tool to a power tool. The arbor assembly includes a shaft defining a longitudinal axis and having an end portion configured to couple to the cutting tool, and a plate substantially surrounding a portion of the shaft adjacent to the end portion. The plate has a first surface configured to engage the cutting tool when the cutting tool is coupled to the shaft and a second surface substantially opposite the first surface. The plate is movable along the longitudinal axis relative to the shaft. The arbor assembly also includes a wedge member positioned adjacent to the second surface of the plate and defining an opening to receive a portion of the shaft. The wedge member is movable relative to the plate from a first position, in which the plate is inhibited from moving along the longitudinal axis away from the end portion, to a second position, in which the plate is movable along the longitudinal axis away from the end portion.

In another embodiment, the arbor assembly includes a shaft defining a longitudinal axis and having an end portion configured to couple to the cutting tool, and a plate surrounding a portion of the shaft adjacent to the end portion. The plate has a first surface configured to engage the cutting tool when the cutting tool is coupled to the shaft and a second surface substantially opposite the first surface. The plate is movable relative to the shaft in a first direction substantially parallel to the longitudinal axis. The arbor assembly also includes a wedge member positioned adjacent to the second surface of the plate and defining an opening to receive a portion of the shaft. The wedge member substantially inhibits movement of the plate in the first direction away from the end portion. The arbor assembly further includes an actuator coupled to the wedge member. The actuator is operable to move the wedge member relative to the shaft and the plate in a second direction substantially perpendicular to the longitudinal axis. Movement of the wedge member in the second direction allows movement of the plate in the first direction.

In yet another embodiment, the invention provides a cutting tool assembly including a cutting tool and an arbor assembly. The arbor assembly includes a shaft defining a longitudinal axis and having an end portion coupled to the cutting tool, and a first plate surrounding a portion of the shaft adjacent to the end portion. The first plate has a first surface engaging the cutting tool and a second surface substantially opposite the first surface. The first plate is movable along the longitudinal axis relative to the shaft. The arbor assembly also includes a second plate spaced apart from the first plate and surrounding a portion of the shaft. The second plate has a first surface facing away from the first plate and a second surface substantially opposite the first surface. The arbor assembly further includes a wedge member positioned between the second surface of the first plate and the second surface of the second plate and surrounding a portion of the shaft. The wedge member is movable relative to the first plate and the second plate from a first position, in which the first plate is inhibited from moving along the longitudinal axis away from the cutting tool, to a second position, in which the first plate is movable along the longitudinal axis away from the cutting tool. The arbor assembly additionally includes an actuator coupled to the wedge member. The actuator is operable to move the wedge member from the first position to the second position.

Other aspects of the invention will become apparent by consideration of the detailed description and accompanying drawings.

Figure 1:
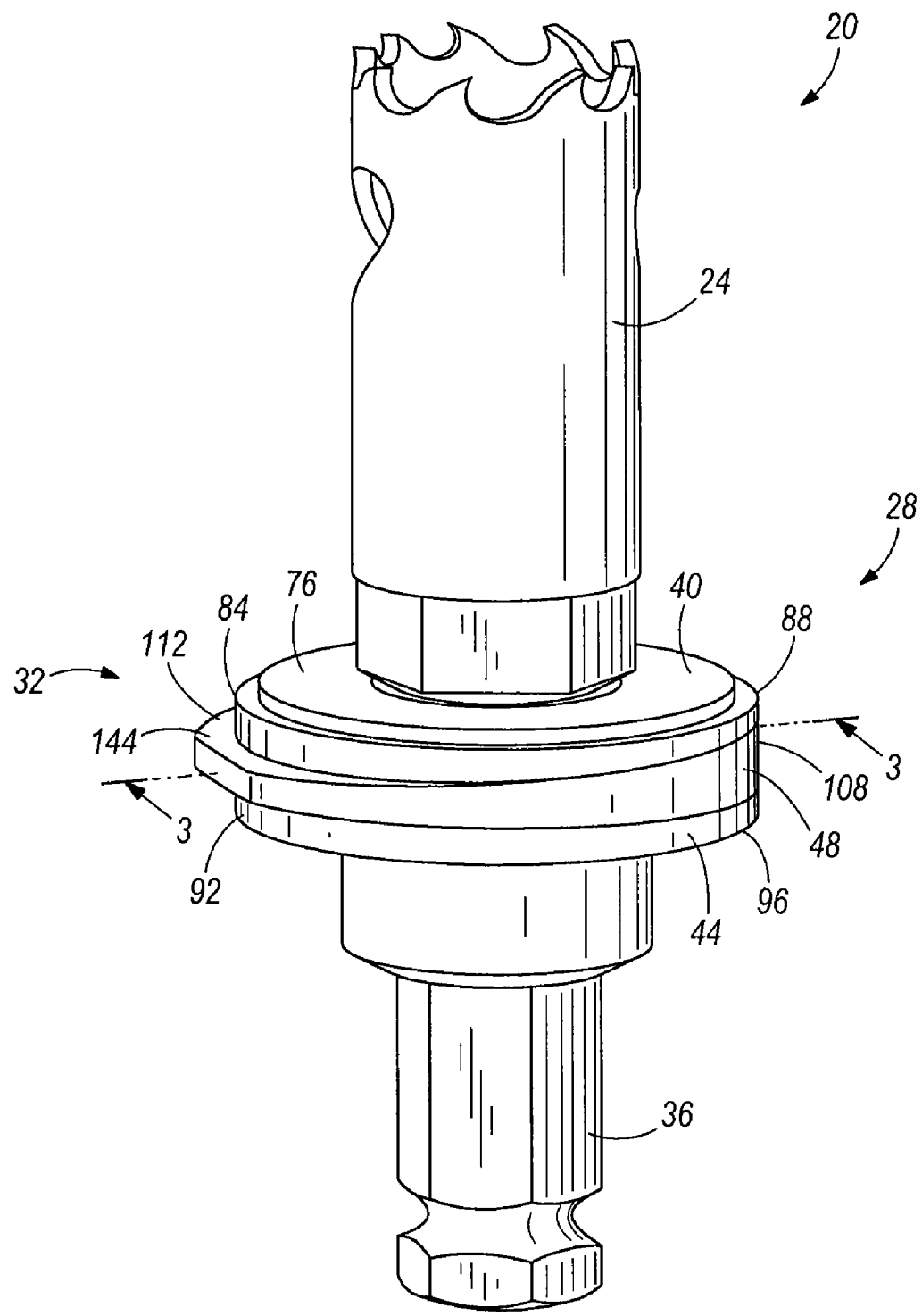
FIG. 1 is a perspective view of a cutting tool assembly including a cutting tool and an arbor assembly embodying the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

DETAILED DESCRIPTION

FIGS. 1-4 illustrate a cutting tool assembly 20 for use with a power tool (e.g., a drill, a driver-drill, a hammer drill, an electric screwdriver, or the like). The illustrated cutting tool assembly 20 includes a cutting tool 24 and an arbor assembly 28 having a release mechanism 32. In the illustrated embodiment, the cutting tool 24 is a hole saw that is operable to cut holes of different sizes in a work piece and/or remove plugs from a work piece. The cutting tool 24 threadably couples to the arbor assembly 28 to connect the cutting tool 24 to the power tool. As the power tool rotates the cutting tool 24 to cut a work piece, the cutting tool 24 may tighten or jam onto the arbor assembly 28, making it difficult for a user to manually disconnect (e.g., unthread) the cutting tool 24 from the arbor assembly 28. The release mechanism 32 provides a quick and efficient means to relieve pressure between the cutting tool 24 and the arbor assembly 28 to allow a user to easily disconnect the cutting tool 24 from the arbor assembly 28, as further described below.

The illustrated arbor assembly 28 includes an elongated drive shaft 36, a first plate 40, a second plate 44, and a wedge member 48. The drive shaft 36 is connectable to a spindle, or chuck, of a power tool to transmit rotation from the power tool to the cutting tool 24. In the illustrated embodiment, the drive shaft 36 defines a longitudinal axis 52 and includes a threaded portion 56 adjacent to one end of the shaft 36. The threaded portion 56 engages corresponding threads 60 (FIGS. 3 and 4) on the cutting tool 24 to threadably couple the cutting tool 24 to the shaft 36. The drive shaft 36 also includes a shoulder 64 to support the second plate 44 and a groove 68 to receive a snap ring 72.

Figure 3:
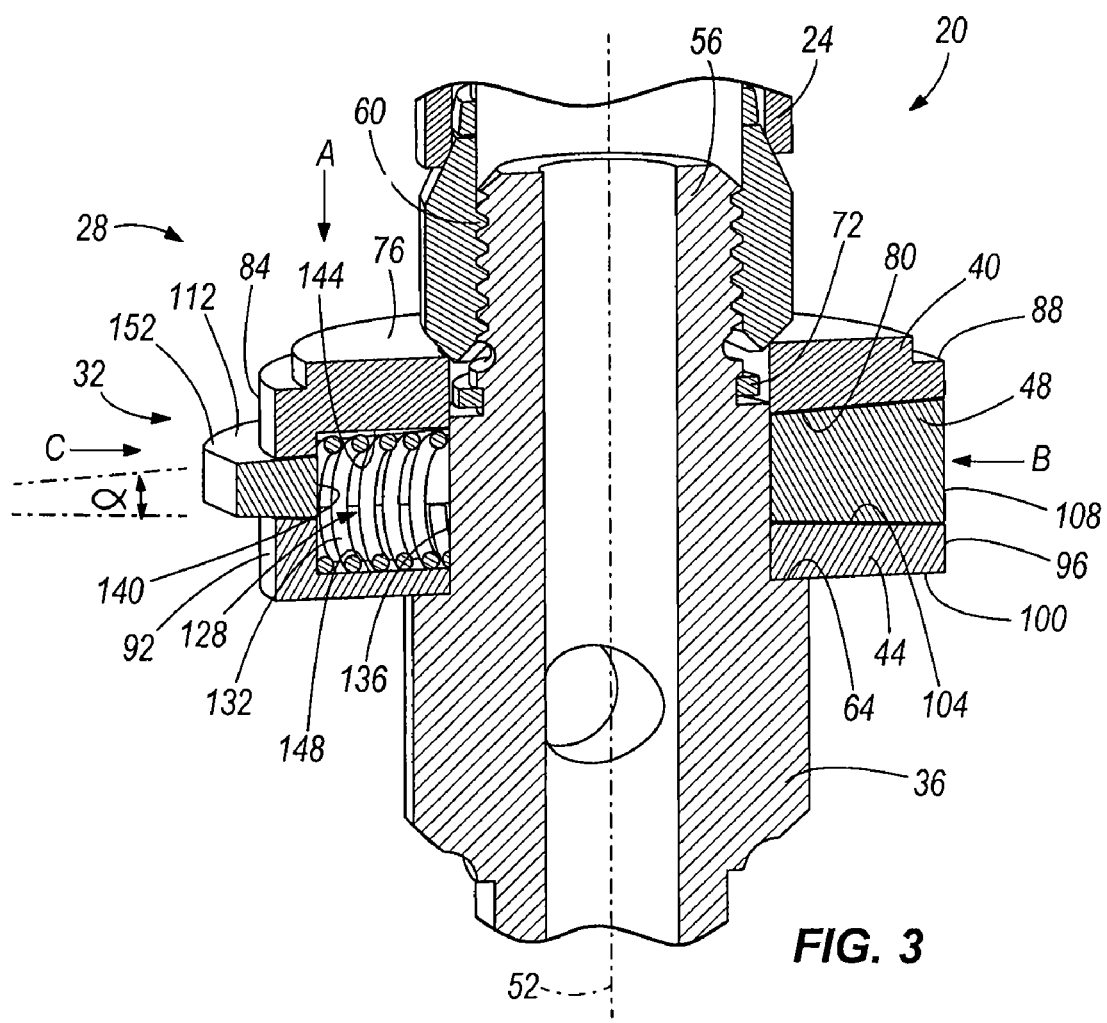
FIG. 3 is a cross-sectional view of the cutting tool assembly taken along section line 3-3 of FIG. 1, including a wedge member in an extended position.
Figure 4:
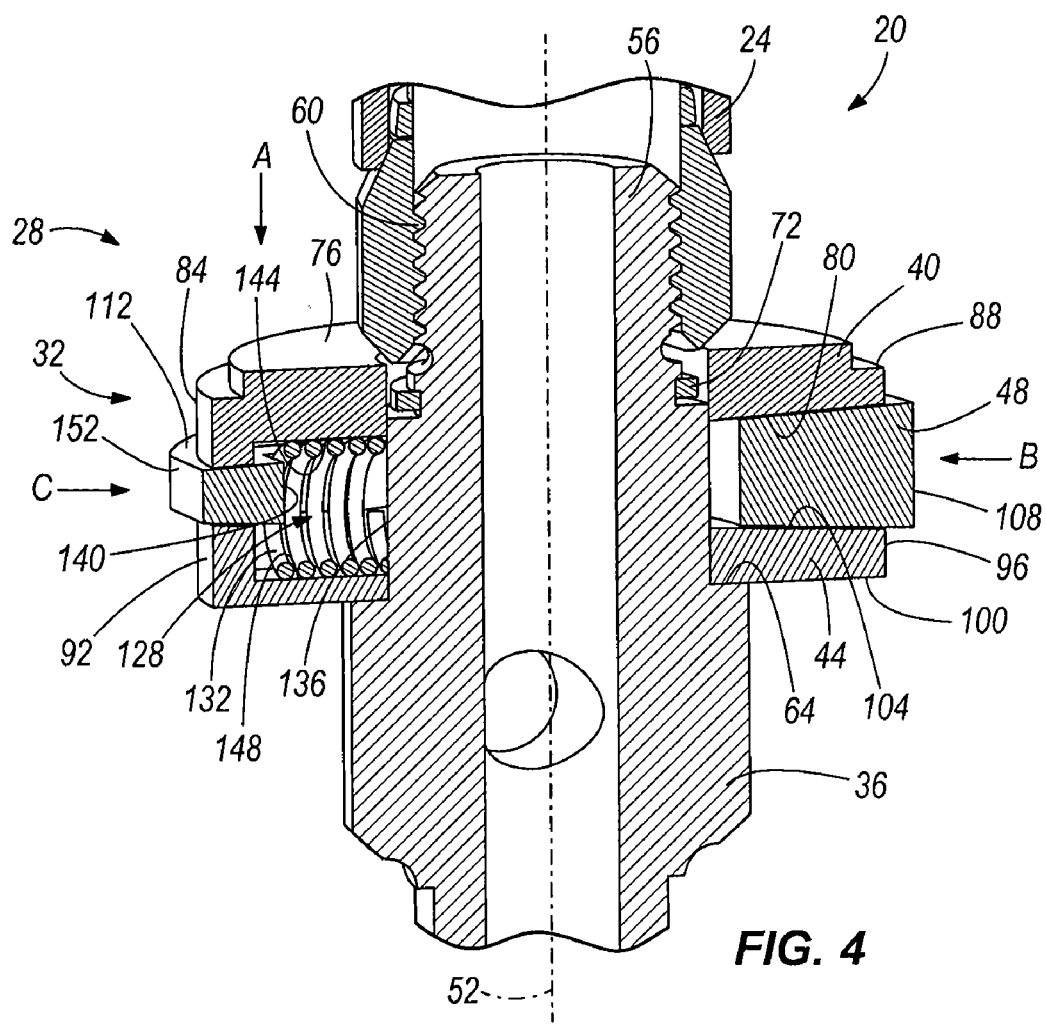
FIG. 4 is a cross-sectional view of the cutting tool assembly taken along section line 3-3 of FIG. 1, including the wedge member in a collapsed position.
Figure 5:
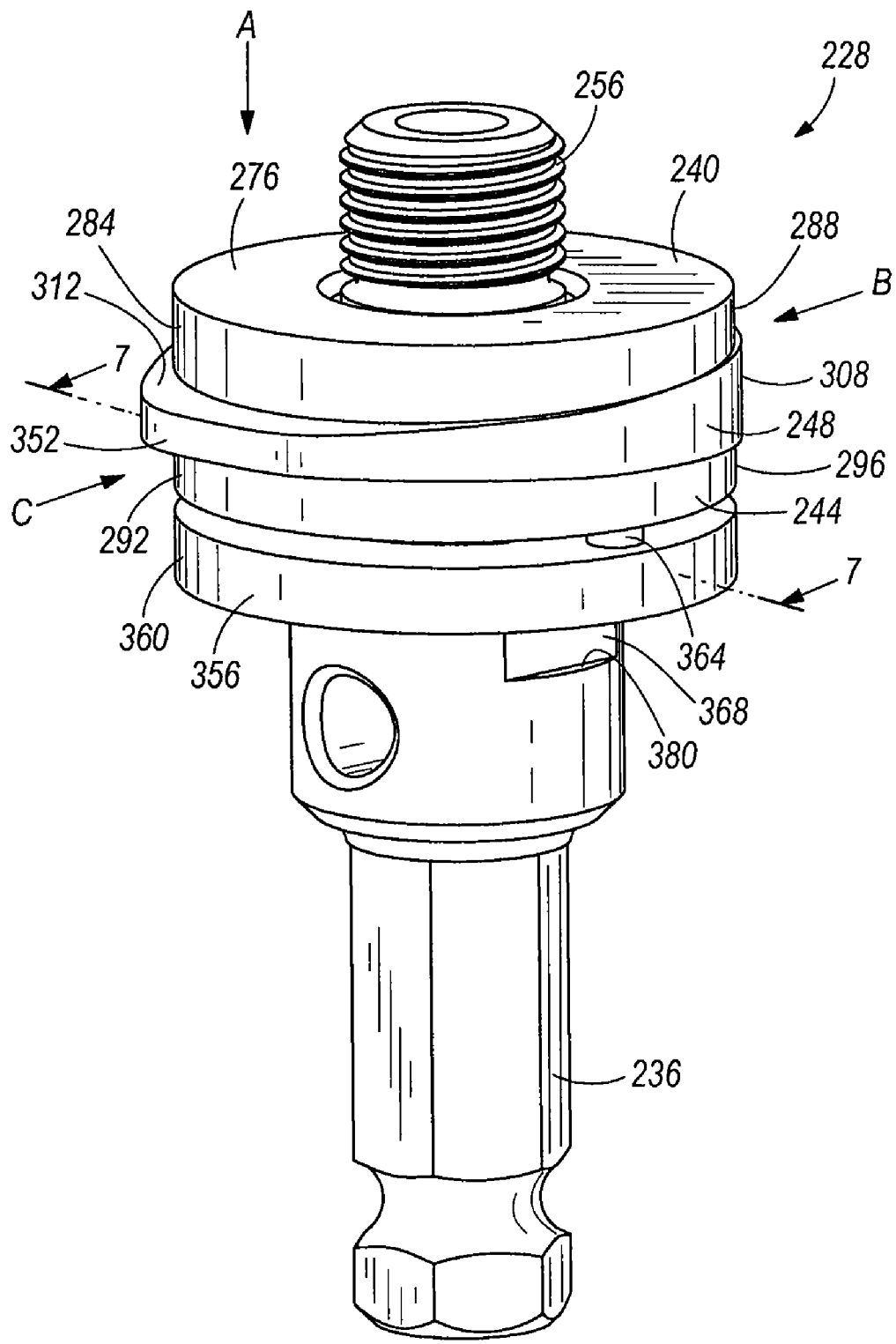
FIG. 5 is a perspective view of another arbor assembly embodying the invention.

The first plate 40 surrounds a portion of the shaft 36 adjacent to the threaded portion 56 and is generally held on the shaft 36 by the snap ring 72. In the illustrated embodiment, the first plate 40 is generally circular. In other embodiments, the first plate 40 may be square, rectangular, hexagonal, oblong, or the like. The first plate 40 includes a first surface 76 that engages the cutting tool 24 and a second surface 80 substantially opposite the first surface 76. The plate 40 is movable in a first direction A (FIGS. 3 and 4) along the longitudinal axis 52 and away from the threaded portion 56 when the wedge member 48 is displaced, as further explained below. As shown in FIGS. 3 and 4, the first plate 40 is substantially tapered, or wedge-shaped, such that the thickness of the plate 40 decreases from a first end 84 to a second end 88. The degree of taper generally corresponds to the shape of the wedge member 48 such that, when the first plate 40 rests on the wedge member 48, the first surface 76 is generally perpendicular to the longitudinal axis 52.

As shown in FIGS. 1-4, the second plate 44 is positioned between the shoulder 64 of the shaft 36 and the wedge member 48 and surrounds a portion of the shaft 36. Similar to the first plate 40, the second plate 44 is generally circular, but may alternatively be square, rectangular, hexagonal, oblong, or the like. The second plate 44 is also substantially tapered, or wedge-shaped, such that the thickness of the plate 44 decreases from a first end 92 to a second end 96. The second plate 44 includes a first surface 100 that engages the shoulder 64 of the shaft 36 and a second surface 104 substantially opposite the first surface 100. In some embodiments, the second plate 44 may be omitted such that the wedge member 48 directly engages the shoulder 64 of the shaft 36. In other embodiments, the second plate 44 may be integrally formed with or permanently fixed to the shaft 36 such that the second plate 44 defines the shoulder 64.

The wedge member 48 also surrounds a portion of the shaft 36 and is positioned between the first plate 40 and the second plate 44. Similar to the first plate 40 and the second plate 44, the wedge member 48 is generally circular, but may alternatively be square, rectangular, hexagonal, oblong, or the like. In the illustrated embodiment, the wedge member 48 is a single unitary member that tapers from a first end 108 to a second end 112. In some embodiments, a taper angle $\alpha$ (FIG. 3) of the wedge member 48 is between about 1° to about 5°. In the illustrated embodiment, the taper angle $\alpha$ is between about 2° to about 3°.

Figure 2:
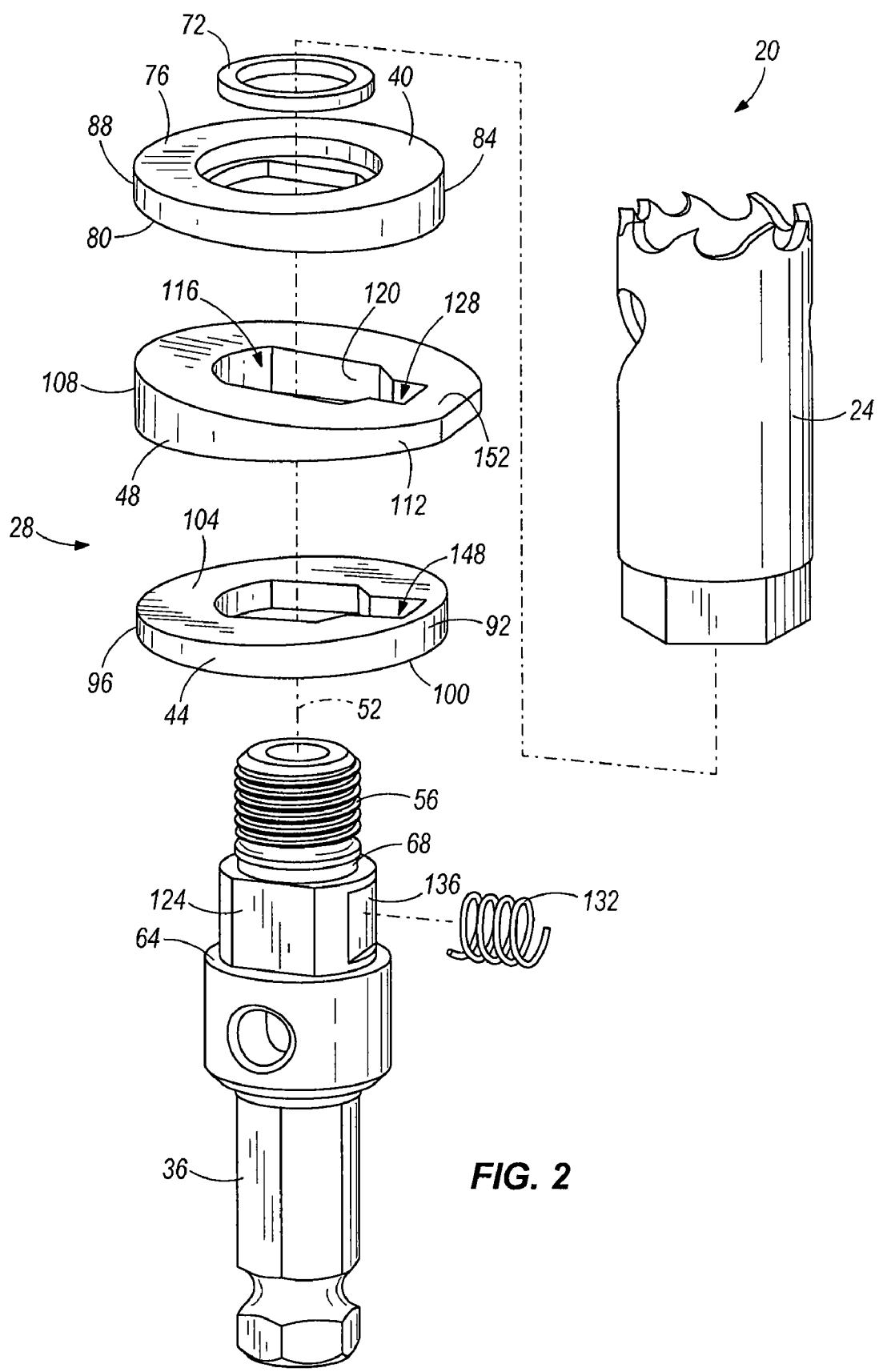
FIG. 2 is an exploded perspective view of the cutting tool assembly of FIG. 1.

As shown in FIG. 2, the wedge member 48 defines a central opening 116 to receive the shaft 36. The opening 116 is generally larger than an outer circumference of the shaft 36 such that the wedge member 48 can move transverse relative to the shaft 36 and the plates 40, 44 between a first, or extended, position (FIG. 3) and a second, or collapsed, position (FIG. 4). In the illustrated embodiment, the opening 116 is partially defined by two planar, inner sidewalls 120. The planar sidewalls 120 correspond to flattened surface portions 124 on the shaft 36 to inhibit rotation of the wedge member 48 relative to the shaft 36.

As shown in FIG. 2-4, the opening 116 also includes a generally rectangular cutout portion 128 extending radially outward. The cutout portion 128 receives a biasing member 132 positioned between another flattened surface portion 136 on the shaft 36 and an inner surface 140 of the wedge member 48. The first plate 40 and the second plate 44 include corresponding cutout portions 144, 148 to provide additional clearance for the biasing member 132. In the illustrated embodiment, the biasing member 132 is a coil spring. In other embodiments, other suitable elastomeric members may also or alternatively be employed. The biasing member 132 biases the wedge member 48 relative to the plates 40, 44 in a second direction B generally perpendicular to the longitudinal axis 52 and toward the extended position (FIG. 3).

In the illustrated embodiment, the wedge member 48 includes an outwardly-extending projection 152, or actuator, to facilitate movement of the wedge member 48 relative to the shaft 36 and the plates 40, 44. The illustrated projection 152 is integrally formed as a single piece with the wedge member 48 on the second end 112 of the wedge member 48. In other embodiments, the projection 152 may be a separate component that is removably or permanently coupled to the wedge member 48. Actuating (e.g., depressing) the projection 152 slides the wedge member 48 relative to the plates 40, 44 in a third direction C substantially opposite the second direction B and toward the collapsed position (FIG. 4).

To cut a work piece with the cutting tool 24, a user threads the cutting tool 24 onto the threaded portion 56 of the shaft 36 and connects the shaft 36 to a power tool. Operating the power tool rotates the arbor assembly 28 and the cutting tool 24 to cut a hole in the work piece. Once the cutting operation is complete, the user may disconnect (e.g., unthread) the cutting tool 24 from the shaft 36 to store the cutting tool 24 or to switch to a different size (e.g., diameter) cutting tool. However, the cutting tool 24 may become locked or jammed onto the threaded portion 56 of the shaft 36, making the cutting tool 24 very difficult to manually disconnect from the shaft 36. Actuating the release mechanism 32 (e.g., actuating the wedge member 48 between the first and second plates 40, 44) helps relieve pressure between the cutting tool 24 and the threaded portion 56 of the shaft 36, allowing the user to more easily unthread the tool 24 by hand.

As shown in FIG. 3, the wedge member 48 is initially in the extended position during a cutting operation. Depressing the projection 152 on the wedge member 48 slides the wedge member 48 relative to the plates 40, 44 and the shaft 36 in the third direction C (to the right in FIG. 3) from the extended position to the collapsed position (FIG. 4). As the wedge member 48 moves in the third direction C, pressure from the cutting tool 24 on the first surface 76 of the first plate 40 pushes the first plate 40 in the first direction A (downward in FIG. 3), moving the first plate 40 away from the threaded portion 56 of the shaft 36 and the cutting tool 24. Movement of the first plate 40 in the first direction A relieves pressure between the threads 60 of the cutting tool 24 and the threaded portion 56 of the shaft 36 such that the user may then unthread the cutting tool 24 by hand. In some embodiments, the user can move the wedge member 48 by striking the projection 152 against a hard surface (e.g., a workbench, a tabletop, the ground, etc.) or by striking the projection 152 with a blunt object (e.g., a hammer, etc.).

Once the cutting tool 24 is disconnected (e.g., unthreaded) from the shaft 36, the biasing member 132 biases the wedge member 48 in the second direction B (to the left in FIG. 4). As the wedge member 48 moves in the second direction B, the first plate 40 is pushed back toward the threaded portion 56 of the shaft 36 (upward in FIG. 4). The snap ring 72 limits the amount of movement of the first plate 40 toward the threaded portion 56 and inhibits the first plate 40 from falling off of the shaft 36 when the cutting tool 24 is disconnected. When it is desired to perform another cutting operation, the cutting tool 24 is reconnected to the arbor assembly 28, or a different cutting tool is connected to the arbor assembly 28, to perform the next cutting operation.

FIGS. 5-8 illustrate an arbor assembly 228 according to another embodiment of the invention. The illustrated arbor assembly 228 is similar to the arbor assembly 28 discussed above with reference to FIGS. 1-4 and like parts have been given the same reference numbers plus 200. Reference is hereby made to the description of the arbor assembly 228 above for description of the features and elements, as well as alternatives to the features and elements, of the arbor assembly 228 not specifically discussed below.

The illustrated arbor assembly 228 includes an elongated drive shaft 236, a first plate 240, a second plate 244, and a wedge member 248. The drive shaft 236 is connectable to a spindle, or chuck, of a power tool to transmit rotation from the power tool to a cutting tool (e.g., the hole saw 24 shown in FIGS. 1-4). In the illustrated embodiment, the drive shaft 236 defines a longitudinal axis 252 and includes a threaded portion 256 adjacent to one end of the shaft 236. The threaded portion 256 engages corresponding threads on the cutting tool to threadably couple the cutting tool the shaft 236. The drive shaft 236 also includes a shoulder 264 to support the second plate 244 and a groove 268 to receive a snap ring 272.

Figure 7:
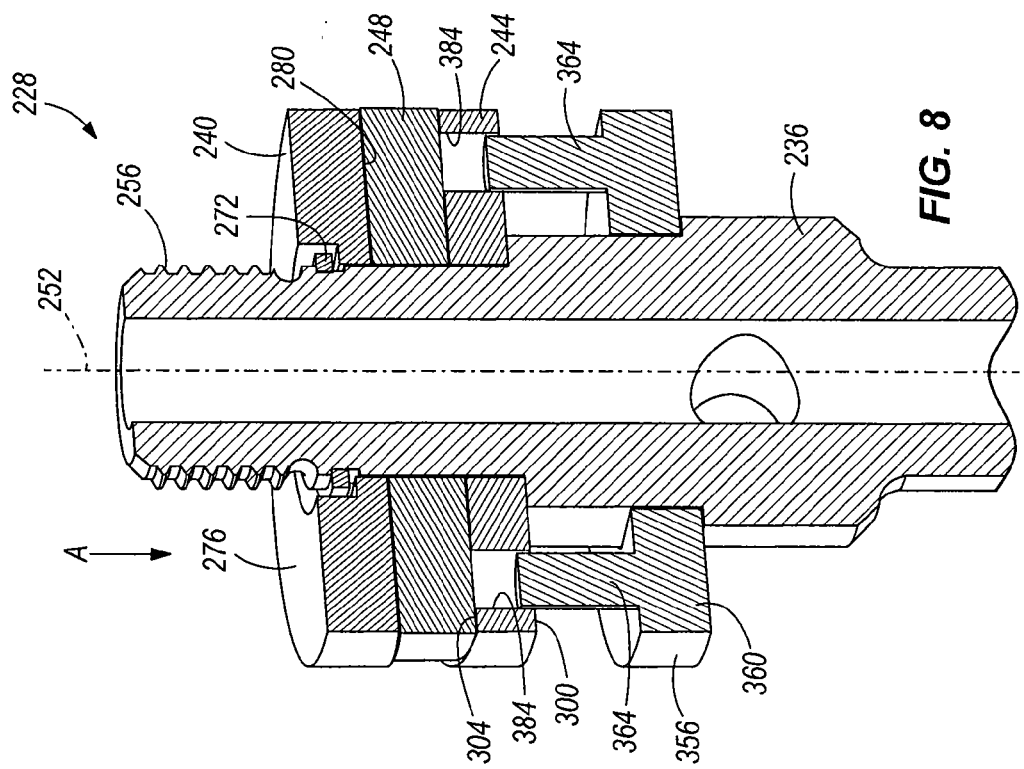
FIG. 7 is a cross-sectional view of the arbor assembly taken along section line 7-7 of FIG. 5, including a wedge member in an extended position.
Figure 8:
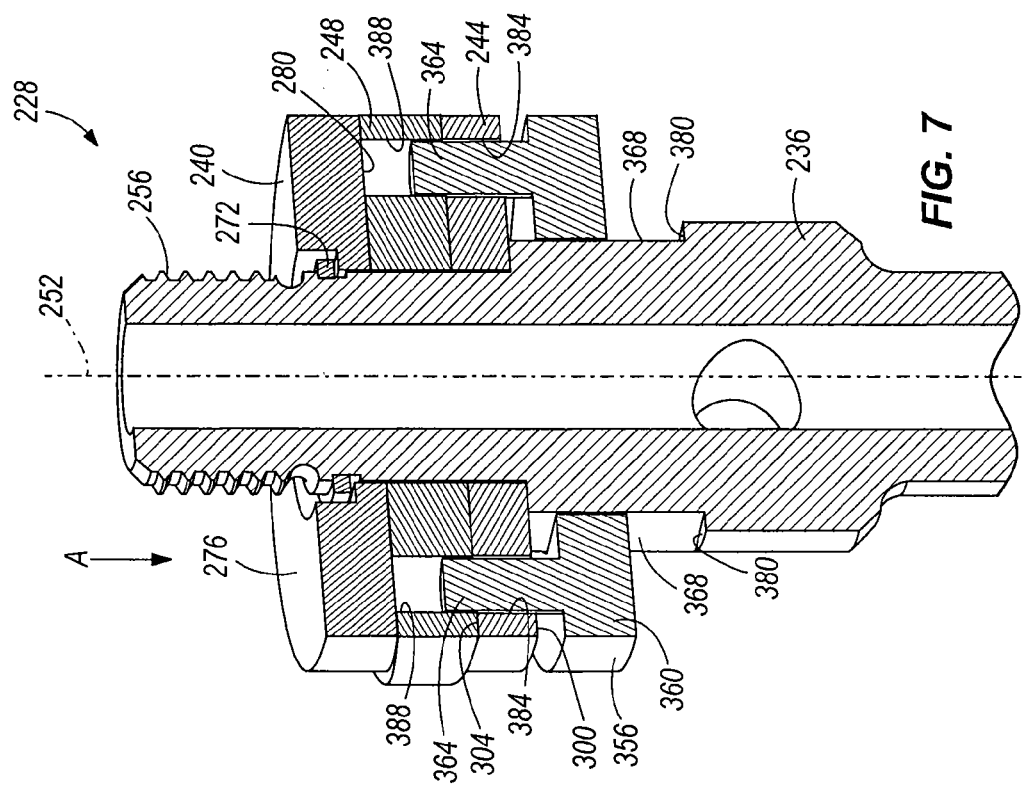
FIG. 8 is a cross-sectional view of the arbor assembly taken along section line 7-7 of FIG. 5, including the wedge member in a collapsed position.
Figure 9:
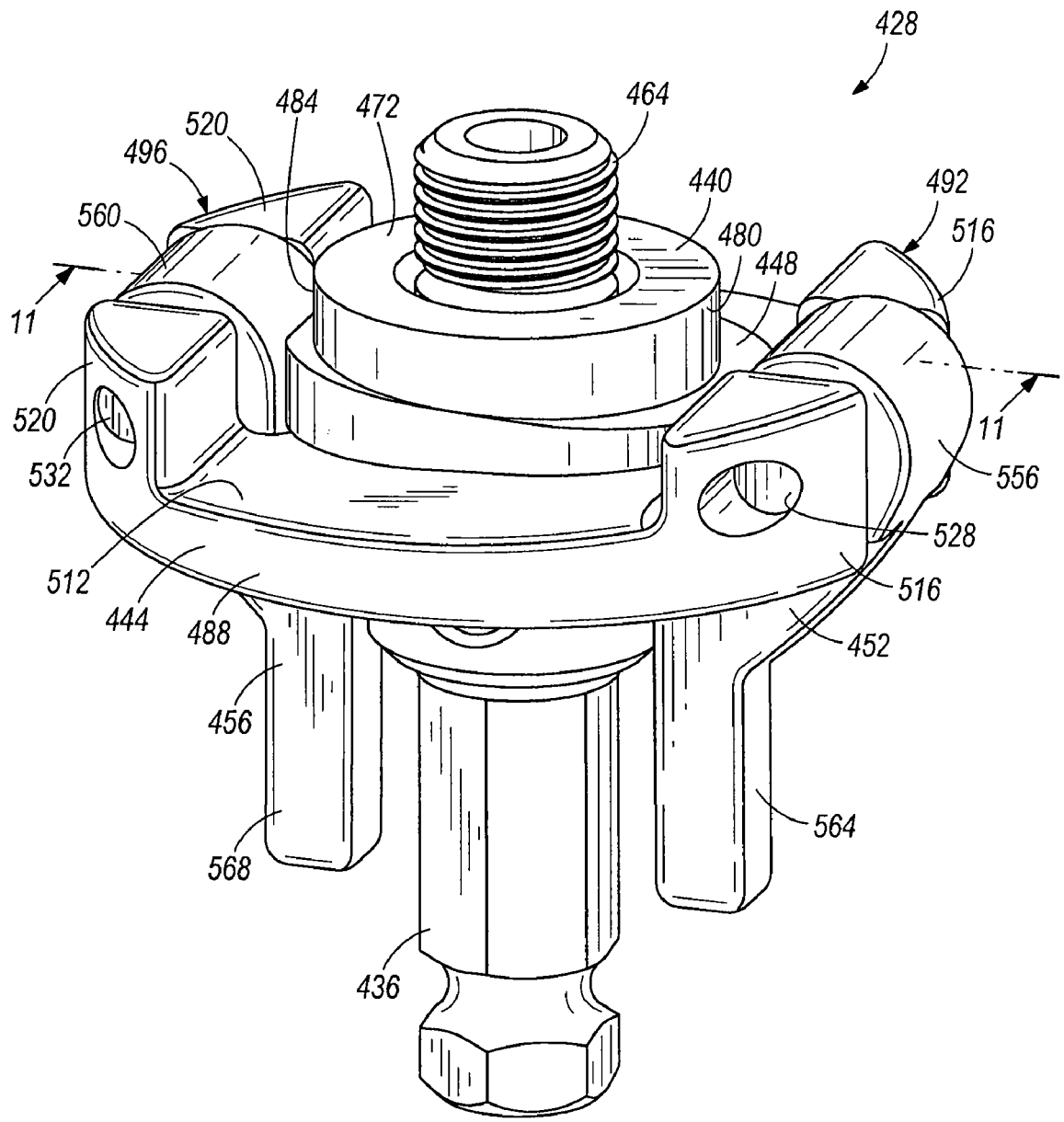
FIG. 9 is a perspective view of yet another arbor assembly embodying the invention.

The first plate 240 surrounds a portion of the shaft 236 adjacent to the threaded portion 256 and is generally held on the shaft 236 by the snap ring 272. In the illustrated embodiment, the first plate 240 is generally circular, but may alternatively be square, rectangular, hexagonal, oblong, or the like. The first plate 240 includes a first surface 276 that engages a cutting tool and a second surface 280 substantially opposite the first surface 276. The plate 240 is movable in a first direction A along the longitudinal axis 252 relative to the shaft 236 and away from the threaded portion 256 when the wedge member 248 is displaced. As shown in FIGS. 7 and 8, the first plate 240 is substantially tapered, or wedge-shaped, such that the thickness of the plate 240 decreases from a first end 284 to a second end 288.

The second plate 244 is positioned between the shoulder 264 of the shaft 236 and the wedge member 248 and surrounds a portion of the shaft 236. Similar to the first plate 240, the second plate 244 is generally circular, but may alternatively be square, rectangular, hexagonal, oblong, or the like. The second plate 244 is also substantially tapered, or wedge-shaped, such that the thickness of the plate 244 decreases from a first end 292 to a second end 296. The second plate 244 includes a first surface 300 that engages the shoulder 264 of the shaft 236 and a second surface 304 substantially opposite the first surface 300.

The wedge member 248 also surrounds a portion of the shaft 236 and is positioned between the first plate 240 and the second plate 244. Similar to the first plate 240 and the second plate 244, the wedge member 248 is generally circular, but may alternatively be square, rectangular, hexagonal, oblong, or the like. In the illustrated embodiment, the wedge member 248 is a single unitary member that tapers from a first end 308 to a second end 312. Similar to the wedge member 48 of FIGS. 1-4, the illustrated wedge member 248 has a taper angle between about 1° to about 5°.

Figure 6:
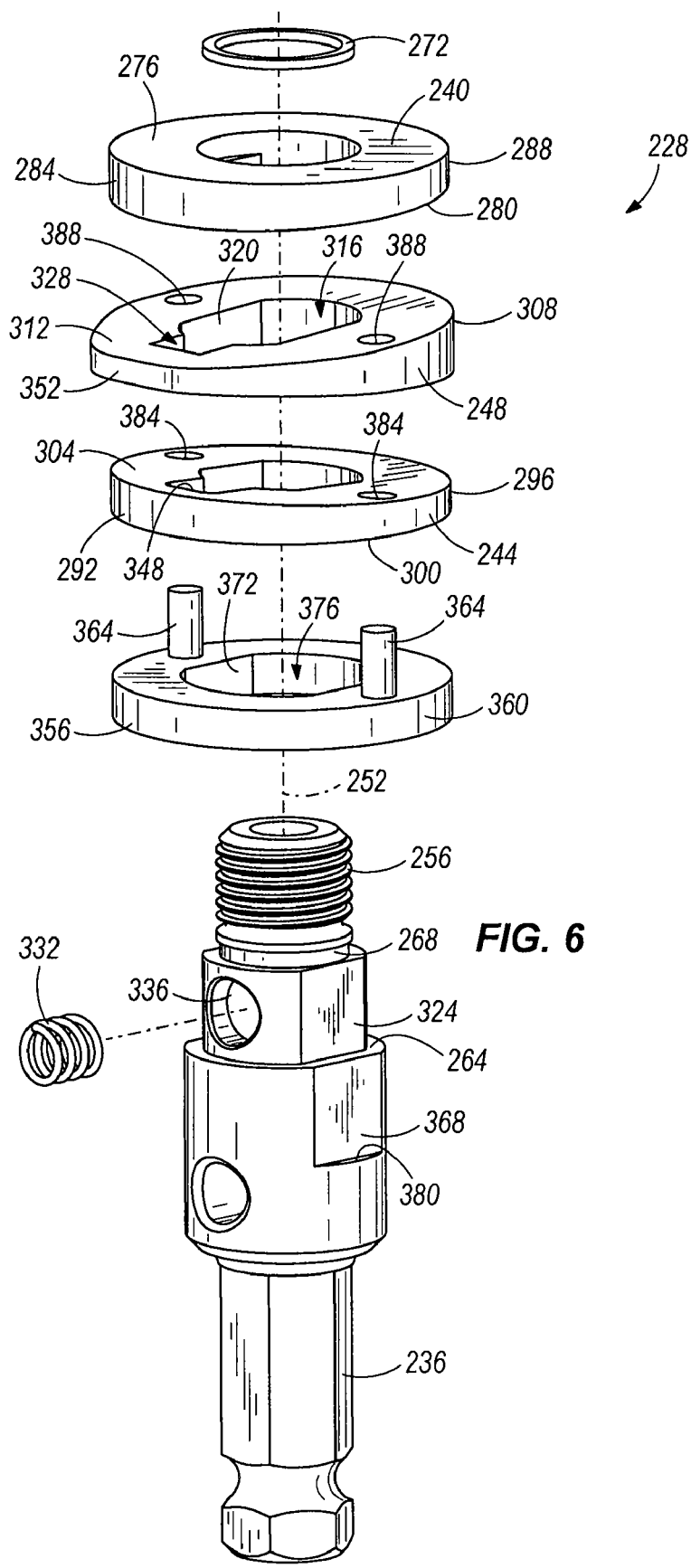
FIG. 6 is an exploded perspective view of the arbor assembly of FIG. 5.

As shown in FIG. 6, the wedge member 248 defines a central opening 316 to receive a portion of the shaft 236. The opening 316 is generally larger than an outer circumference of the shaft 236 such that the wedge member 248 can move transverse relative to the shaft 236 and the plates 240, 244 between a first, or extended, position (FIG. 7) and a second, or collapsed, position (FIG. 8). In the illustrated embodiment, the opening 316 is partially defined by two planar, inner sidewalls 320. The planar sidewalls 320 correspond to flattened surface portions 324 on the shaft 236 to inhibit rotation of the wedge member 248 relative to the shaft 236.

The opening 316 also includes a generally rectangular cutout portion 328 extending radially outward. The cutout portion 328 receives a biasing member 332 positioned between a recessed opening 336 in the shaft 236 and an inner surface (not shown) of the wedge member 248. The first plate 240 and the second plate 244 include corresponding cutout portions 348 to provide additional clearance for the biasing member 332. The illustrated biasing member 332 is a coil spring, but may alternatively be another suitable elastomeric member. The biasing member 332 biases the wedge member 248 relative to the plates 240, 244 in a second direction B (FIG. 5) generally perpendicular to the longitudinal axis 252 and toward the extended position.

In the illustrated embodiment, the wedge member 248 includes an outwardly-extending projection 352 (FIGS. 5 and 6), or actuator, to facilitate movement of the wedge member 248 relative to the shaft 236 and the plates 240, 244. The illustrated projection 352 is integrally formed as a single piece with the wedge member 248, but may alternatively be a separate component that is removably or permanently coupled to the wedge member 248. Actuating (e.g., depressing) the projection 352 slides the wedge member 248 relative to the plates 240, 244 in a third direction C (FIG. 5) generally perpendicular to the longitudinal axis 252 and toward the collapsed position.

As shown in FIGS. 5-8, the arbor assembly 228 also includes a blocking member 356 coupled to the shaft 236. The illustrated blocking member 356 includes a blocking plate 360 and two pins 364. The blocking plate 360 is positioned about a portion of the shaft 236 adjacent to the first surface 300 of the second plate 244 and is movable relative to the shaft 236 along the longitudinal axis 252 between an engaged position (FIG. 7) and a disengaged position (FIG. 8). Similar to the first and second plates 240, 244 and the wedge member 248, the blocking plate 360 is generally circular, but may alternatively be square, rectangular, hexagonal, oblong, or the like. Flattened surface portions 368 on the shaft 236 engage flattened surfaces 372 defining an opening 376 in the blocking plate 360 to inhibit rotation of the blocking plate 360 relative to the shaft 236. The flattened surface portions 368 also define lips 380 to help limit the range of movement of the blocking member 356 along the shaft 236.

The pins 364 are integrally formed as a single piece with the blocking plate 360 and extend axially toward the second plate 244 and the wedge member 248. In some embodiments, the pins 364 may be separate components that are removably or permanently coupled to the blocking plate 360. In other embodiments, the blocking member 356 may include fewer or more pins 364. When the blocking plate 360 is in the engaged position (FIG. 7), the pins 364 are received in corresponding openings 384, 388 in both the second plate 244 and the wedge member 248, respectively, to inhibit movement of the wedge member 248 from the extended position to the collapsed position. When the blocking plate 360 is moved to the disengaged position (FIG. 8), the pins 364 are moved out of the openings 388 in the wedge member 248 such that the wedge member 248 is movable from the extended position to the collapsed position. In some embodiments, a biasing member (e.g., a coil spring) may be positioned about the shaft 236 between the lips 380 and the blocking plate 360 to bias the blocking member 356 to the engaged position.

To relieve pressure between threads on a cutting tool and the threaded portion 256 of the shaft 236 after a cutting operation, a user moves the blocking member 356 from the engaged position (FIG. 7) away from the second plate 244 (downward in FIG. 7) to the disengaged position (FIG. 8). The pins 364 of the blocking member 356 are thereby moved out of the openings 388 in the wedge member 248. The user then depresses the projection 352 on the wedge member 248 to move the wedge member 248 relative to the plates 240, 244 and the shaft 236 in the third direction C from the extended position (FIG. 7) to the collapsed position (FIG. 8). Pressure from the cutting tool on the first surface 276 of the first plate 240 pushes the first plate 240 in the first direction A (downward in FIG. 7) away from the threaded portion 256 of the shaft 236 and the cutting tool. This movement relieves the pressure between the threads of the cutting tool and the threaded portion 256 of the shaft 236 such that the user may then unthread the cutting tool by hand.

After the cutting tool is disconnected from the arbor assembly 228, the biasing member 332 biases the wedge member 248 in the second direction B, pushing the first plate 240 back toward the threaded portion 256 of the shaft 236 (upward in FIG. 8). The openings 388 in the wedge member 248 also realign with the openings 384 in the second plate 244 such that the pins 364 of the blocking member 356 may be reinserted into both sets of openings 384, 388 by moving the blocking plate 360 toward the second plate 244 (upward in FIG. 8).

FIGS. 9-12 illustrate an arbor assembly 428 according to yet another embodiment of the invention. The illustrated arbor assembly 428 is generally similar to the arbor assemblies 28, 228 discussed above with reference to FIGS. 1-8. Reference is hereby made to the descriptions of the arbor assemblies 28, 228 above for description of the features and elements, as well as alternatives to the features and elements, of the arbor assembly 428 not specifically discussed below.

The illustrated arbor assembly 428 includes an elongated drive shaft 436, a first plate 440, a second plate 444, a wedge member 448, and two cam members 452, 456. The drive shaft 436 is connectable to a spindle, or chuck, of a power tool to transmit rotation from the power tool to a cutting tool (e.g., the hole saw 24 shown in FIGS. 1-4). In the illustrated embodiment, the drive shaft 436 defines a longitudinal axis 460 and includes a threaded portion 464 adjacent to one end of the shaft 436. The threaded portion 464 engages corresponding threads on a cutting tool to threadably couple the cutting tool to the shaft 436. The drive shaft 436 also includes a shoulder 468 to support the second plate 444.

Figure 11:
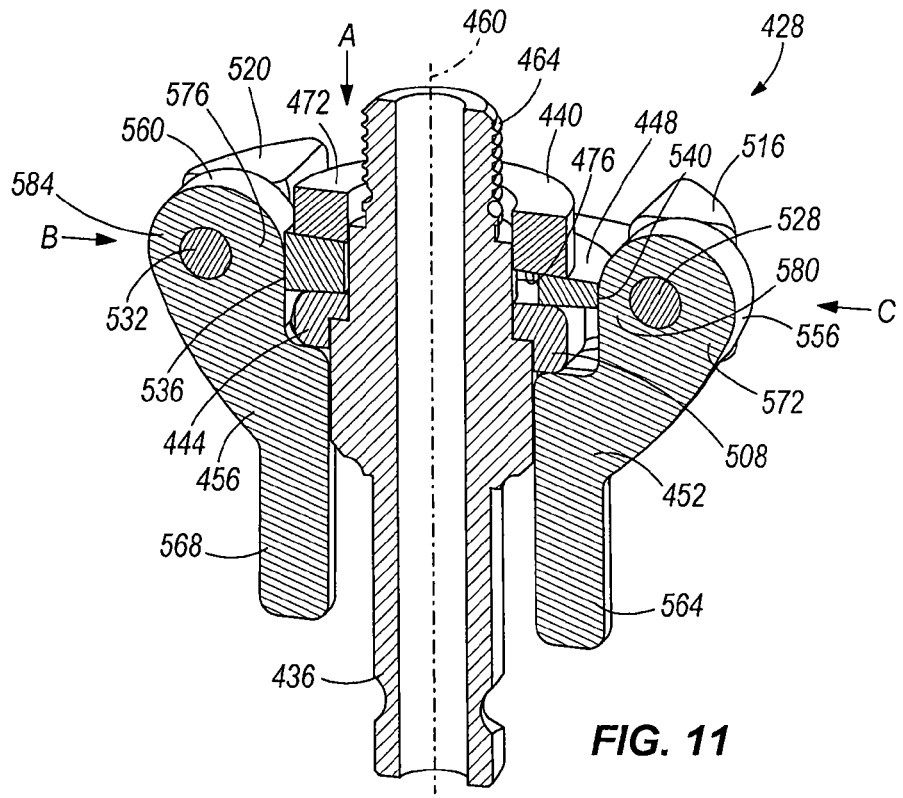
FIG. 11 is a cross-sectional view of the arbor assembly taken along section line 11-11 of FIG. 9, including a wedge member in an extended position.
Figure 12:
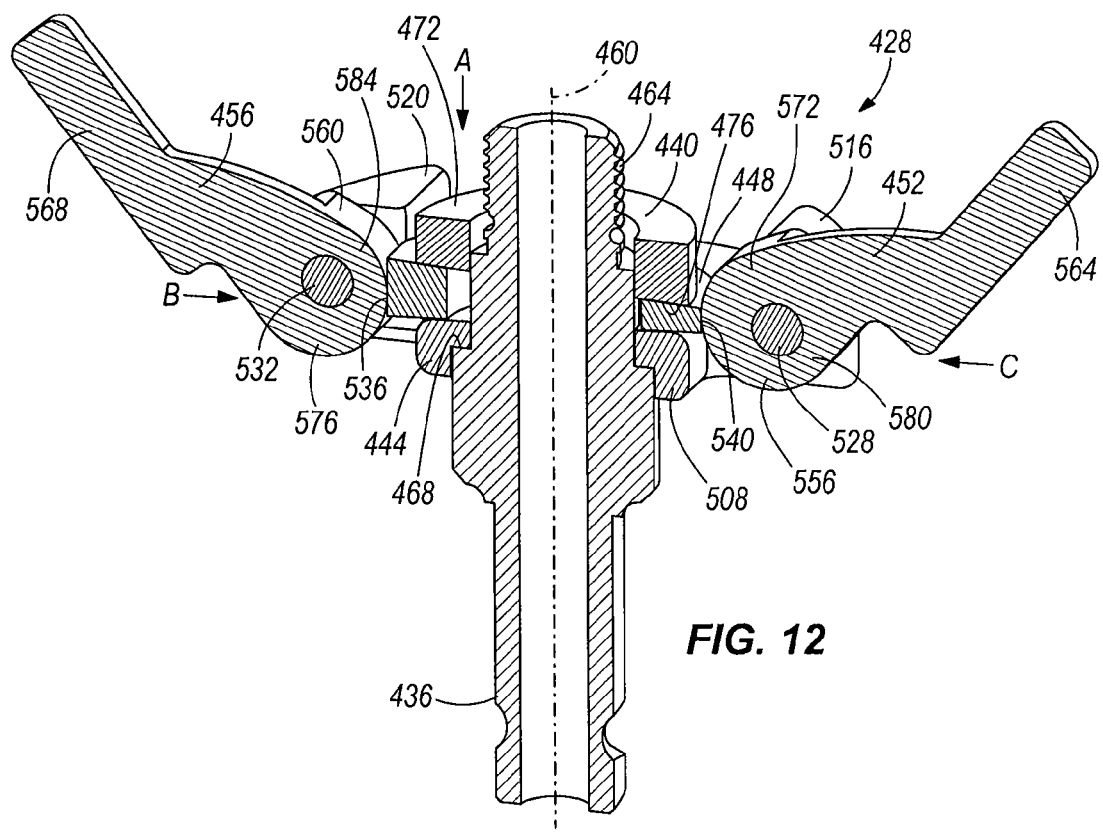
FIG. 12 is a cross-sectional view of the arbor assembly taken along section line 11-11 of FIG. 9, including the wedge member in a collapsed position.

The first plate 440 surrounds a portion of the shaft 436 adjacent to the threaded portion 464. In some embodiments, the arbor assembly 428 may include a snap ring or other suitable means to hold the first plate 440 on the shaft 436 and to prohibit the plate 440 from sliding off of the shaft 436 when a cutting tool is not connected. In the illustrated embodiment, the first plate 440 is generally circular, but may alternatively be square, rectangular, hexagonal, oblong, or the like. The first plate 440 includes a first surface 472 that engages a cutting tool and a second surface 476 substantially opposite the first surface 472. The plate 440 is movable in a first direction A along the longitudinal axis 460 relative to the shaft 436 and away from the threaded portion 464 when the wedge member 448 is displaced. As shown in FIGS. 11 and 12, the first plate 440 is substantially tapered, or wedge-shaped, such that the thickness of the plate 440 decreases from a first end 480 to a second end 484.

Figure 10:
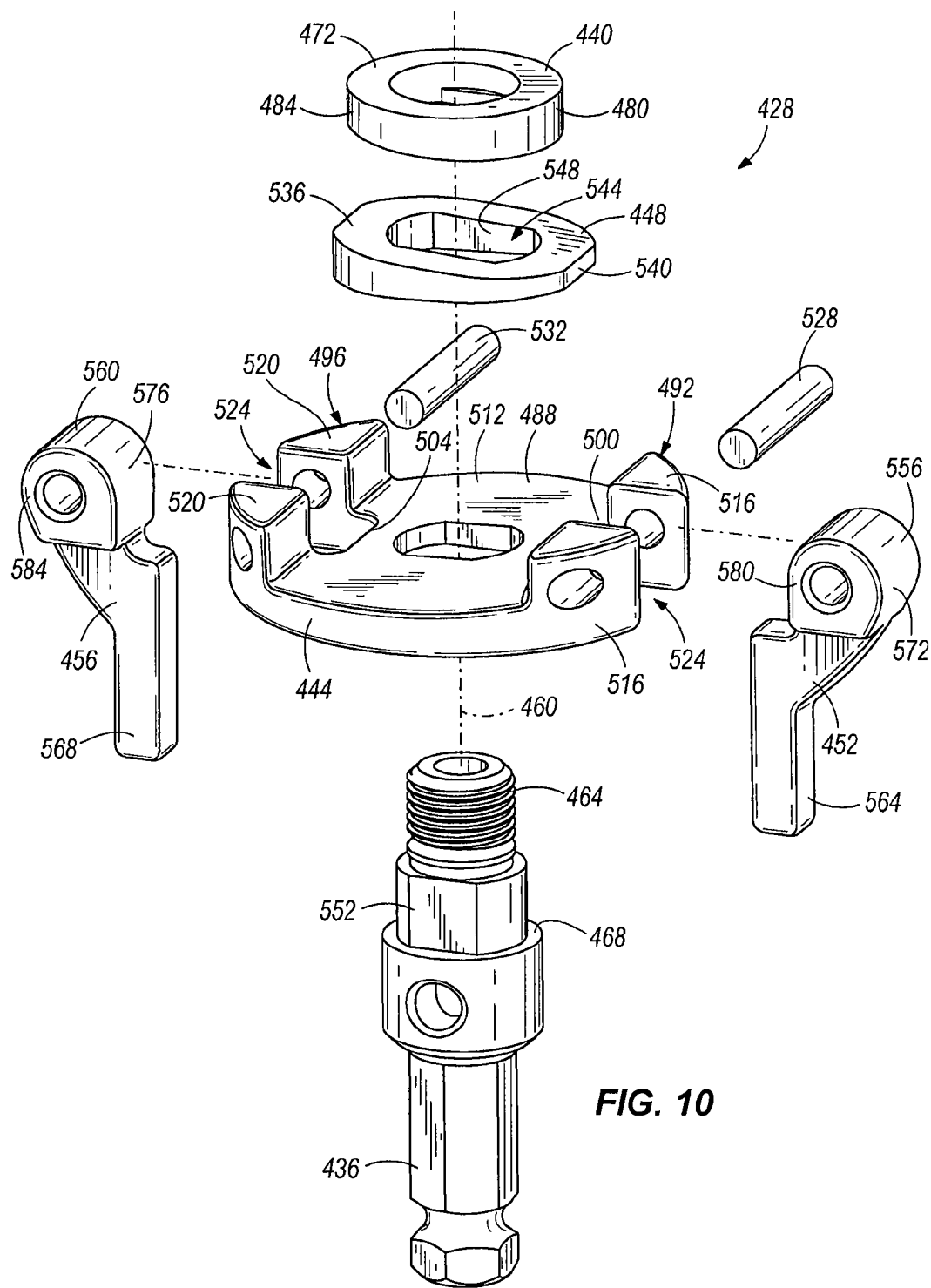
FIG. 10 is an exploded perspective view of the arbor assembly of FIG. 9.

The second plate 444 is positioned between the shoulder 468 of the shaft 436 and the wedge member 448 and surrounds a portion of the shaft 436. As shown in FIG. 10, the second plate 444 includes a base portion 488 and two connecting portions 492, 496 for supporting the cam members 452, 456, respectively. The base portion 488 is substantially tapered, or wedge-shaped, such that the thickness of the base portion 488 decreases from a first end 500 to a second end 504. The base portion 488 includes a flange 508 (FIGS. 11 and 12) that engages the shoulder 468 of the shaft 436 and a planar surface 512 that faces the first plate 440. In some embodiments, the base portion 488 may be integrally formed with or permanently fixed to the shaft 436.

The connecting portions 492, 496 are positioned adjacent to each end 500, 504 of the base portion 488 and provide a location to couple the cam members 452, 456 to the second plate 444. Each connecting portion 492, 496 includes two bosses 516, 520 extending axially toward the first plate 440. The bosses 516, 520 define a gap 524 therebetween to receive a portion of the corresponding cam member 452, 456. A pin 528, 532 extends through each set of bosses 516, 520 and the cam member 452, 456 to rotatably couple the cam member 452, 456 to the connecting portion 492, 496. In other embodiments, other suitable structures may be used to rotatably couple the cam members 452, 456 to the second plate 444.

The wedge member 448 surrounds a portion of the shaft 436 and is positioned between the first plate 440 and the base portion 488 of the second plate 444. The illustrated wedge member 448 is generally an oblong circular shape and extends between the connecting portions 492, 496 of the second plate 444. In other embodiments, the wedge member 448 may be another shape configured to fit on the base portion 488 between the connecting portions 492, 496. In the illustrated embodiment, the wedge member 448 is a single unitary member that tapers from a first end 536 to a second end 540. Similar to the wedge member 48 of FIGS. 1-4, the illustrated wedge member 448 has a taper angle between about 1° to about 5°.

As shown in FIG. 10, the wedge member 448 defines a central opening 544 to receive the shaft 436. The opening 544 is generally larger than an outer circumference of the shaft 436 such that the wedge member 448 can move transverse relative to the shaft 436 and the plates 440, 444 between a first, or extended, position (FIG. 11) and a second, or collapsed, position (FIG. 12). In the illustrated embodiment, the opening 544 is partially defined by two planar, inner sidewalls 548. The planar sidewalls 548 correspond to flattened surface portions 552 on the shaft 436 to inhibit rotation of the wedge member 448 relative to the shaft 436.

Each cam member 452, 456, or actuator, includes a cam 556, 560 and a lever 564, 568. In the illustrated embodiment, the cams 556, 560 and the levers 564, 568 are integrally formed as single pieces. In other embodiments, the cams 556, 560 and the levers 564, 568 may be separate components that are removably coupled or permanently fixed together. The levers 564, 568 allow a user to manually rotate the cams 556, 560 about the pins 528, 532 between the position shown in FIG. 11 and the position shown in FIG. 12.

As shown in FIGS. 11 and 12, each cam 556, 560 includes a larger (e.g., wider) portion 572, 576 and a smaller (e.g., narrower) portion 580, 584. The larger portions 572, 576 alternately engage the wedge member 448 to move the wedge member 448 toward either the extended position (FIG. 11) or the collapsed position (FIG. 12). For example, when the larger portion 576 of the second cam 560 engages the second end 540 of the wedge member 448, as shown in FIG. 11, the cam 560 pushes the wedge member 448 in a second direction B toward the extended position. When the larger portion 572 of the first cam 556 engages the first end 536 of the wedge member 448, as shown in FIG. 12, the cam 556 pushes the wedge member 448 in a third direction C toward the collapsed position. In each position, the smaller portions 580, 584 of the cams 556, 560 provide clearance for the wedge member 448 to move relative to the first and second plates 440, 444.

In other embodiments, the arbor assembly 428 may include a single cam member that moves the wedge member 448 relative to the first and second plates 440, 444 from the extended position to the collapsed position. In such embodiments, the arbor assembly 428 may also include a biasing member to return the wedge member 448 to the extended position.

To relieve pressure between threads on a cutting tool and the threaded portion 464 of the shaft 436 after a cutting operation, a user actuates (e.g., rotates) the levers 564, 568 of the cam members 452, 456 from a first position shown in FIG. 11 to a second position shown in FIG. 12. The larger portion 572 of the first cam 556 thereby engages the first end 536 of the wedge member 448, moving the wedge member 448 relative to the first plate 440 in the third direction C (to the left in FIG. 11) from the extended position (FIG. 11) to the collapsed position (FIG. 12). Pressure from the cutting tool on the first surface 472 of the first plate 440 pushes the first plate 440 in the first direction A (downward in FIG. 11) away from the threaded portion 464 of the shaft 436 and the cutting tool. This movement relieves the pressure between the threads of the cutting tool and the threaded portion 464 of the shaft 436 such that the user may then unthread the cutting tool by hand.

Once the cutting tool is disconnected from the arbor assembly 428, the user actuates the levers 564, 568 of the cam members 452, 456 from the second position shown in FIG. 12 to the first position shown in FIG. 11. The larger portion 576 of the second cam 560 thereby engages the second end 540 of the wedge member 448, sliding the wedge member 448 relative to the first plate 440 in the second direction B (to the right in FIG. 12) from the collapsed position (FIG. 12) to the extended position (FIG. 11). As the wedge member 448 moves, the wedge member 448 pushes the first plate 440 back toward the threaded portion 464 of the shaft 436 (upward in FIG. 12).

FIGS. 13-17 illustrate an arbor assembly 628 according to still another embodiment of the invention. The illustrated arbor assembly 628 is generally similar to the arbor assemblies 28, 228, 428 discussed above with reference to FIGS. 1-12. Reference is hereby made to the descriptions of the arbor assemblies 28, 228, 428 above for description of the features and elements, as well as alternatives to the features and elements, of the arbor assembly 628 not specifically discussed below.

The illustrated arbor assembly 628 includes an elongated drive shaft 636, a first plate 640, a second plate 644, a wedge member 648, and a ring member 652. The drive shaft 636 is connectable to a spindle, or chuck, of a power tool to transmit rotation from the power tool to a cutting tool (e.g., the hole saw 24 shown in FIGS. 1-4). In the illustrated embodiment, the drive shaft 636 defines a longitudinal axis 656 and includes a threaded portion 660 adjacent to one end of the shaft 636. The threaded portion 660 engages corresponding threads on a cutting tool to threadably couple the cutting tool to the shaft 636. The drive shaft 436 also includes a shoulder 664 to support the second plate 644.

Figure 15:
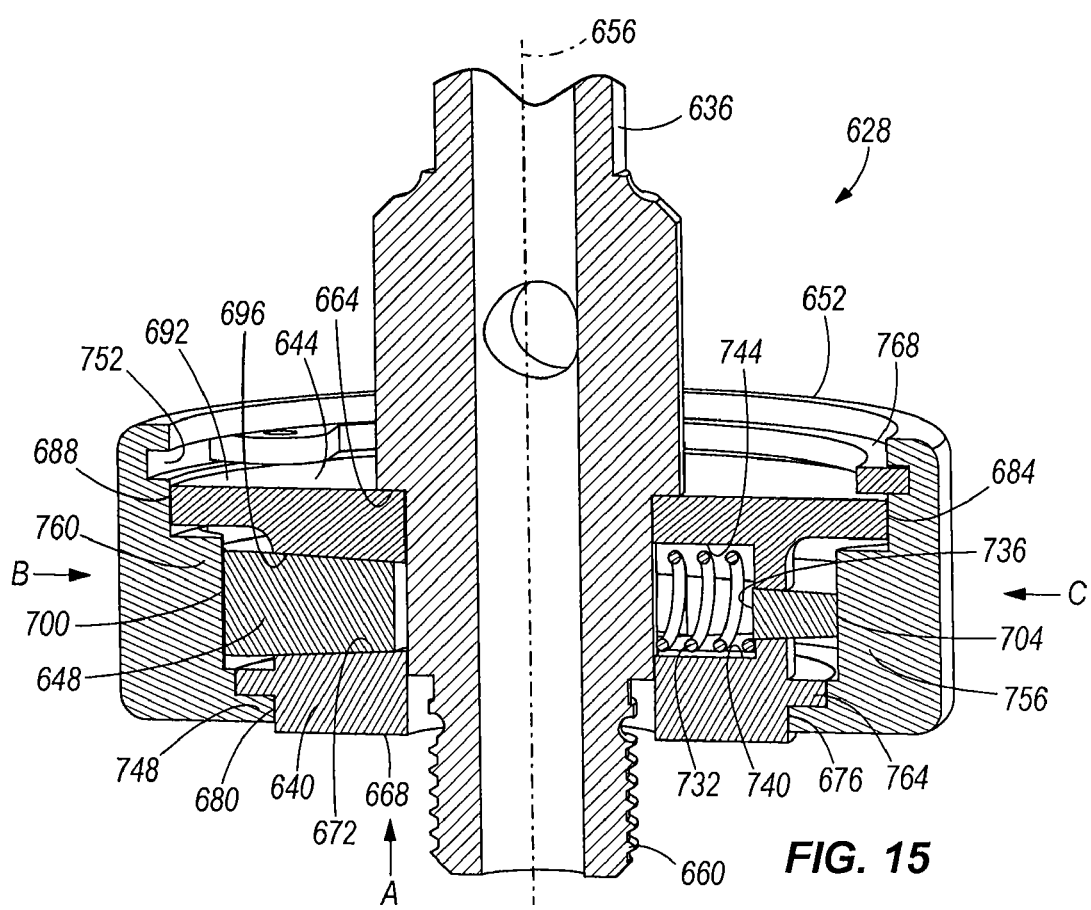
FIG. 15 is a cross-sectional view of the arbor assembly taken along section line 15-15 of FIG. 14.
Figure 17:
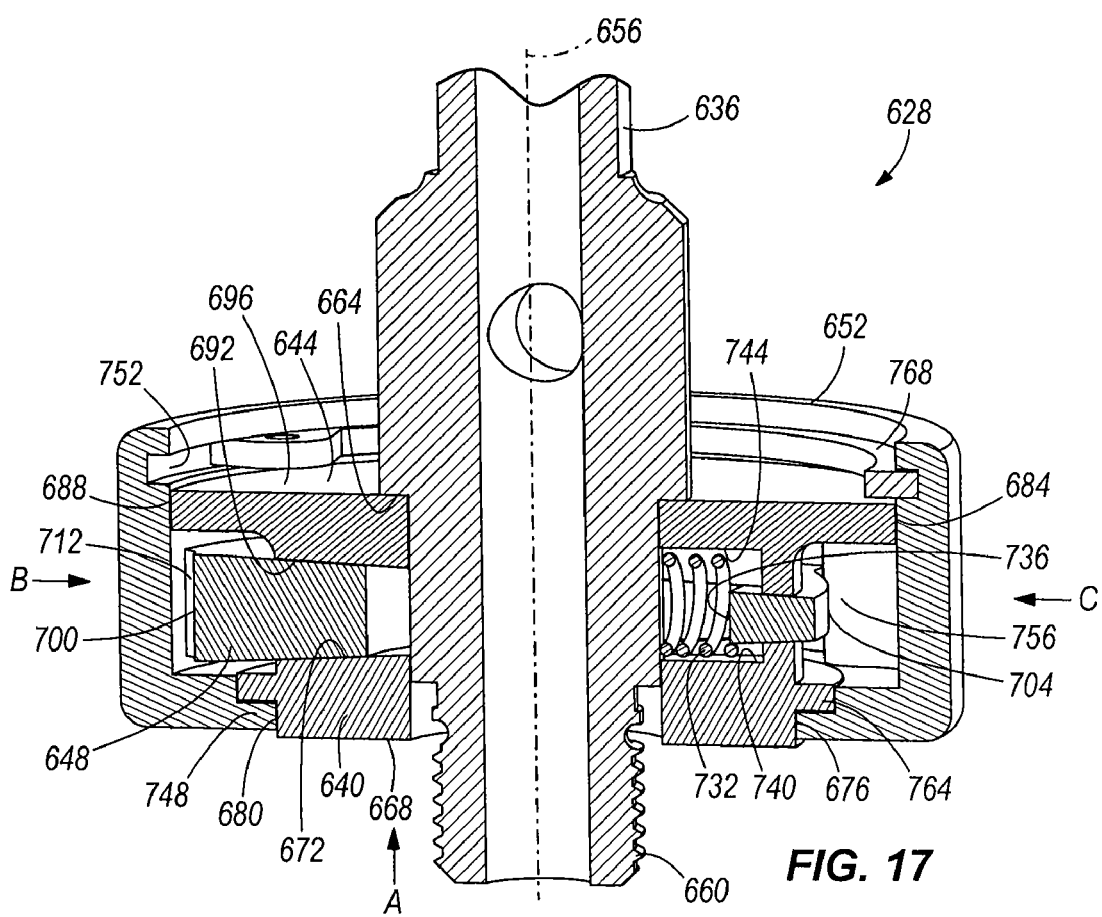
FIG. 17 is a cross-sectional view of the arbor assembly taken along section line 17-17 of FIG. 16.

The first plate 640 surrounds a portion of the shaft 636 adjacent to the threaded portion 660. In the illustrated embodiment, the first plate 640 is generally circular. In other embodiments, the first plate 640 may be square, rectangular, hexagonal, oblong, or the like. The first plate 640 includes a first surface 668 that engages a cutting tool and a second surface 672 substantially opposite the first surface 668. The plate 640 is movable in a first direction A along the longitudinal axis 656 relative to the shaft 636 and away from the threaded portion 660 when the wedge member 648 is displaced. As shown in FIGS. 15 and 17, the first plate 640 is substantially tapered, or wedge-shaped, such that the thickness of the plate 640 decreases from a first end 676 to a second end 680.

The second plate 644 is positioned between the shoulder 664 of the shaft 636 and the wedge member 648 and surrounds a portion of the shaft 636. Similar to the first plate 640, the second plate 644 is generally circular, but may alternatively be square, rectangular, hexagonal, oblong, or the like. The second plate 644 is also substantially tapered, or wedge-shaped, such that the thickness of the plate 644 decreases from a first end 684 to a second end 688. The second plate 644 includes a first surface 692 that engages the shoulder 664 of the shaft 636 and a second surface 696 substantially opposite the first surface 692. In some embodiments, the second plate 644 may be integrally formed with or permanently fixed to the shaft 636. The second plate 644 is omitted in FIGS. 14 and 16 to facilitate illustration of the wedge member 648.

The wedge member 648 also surrounds a portion of the shaft 636 and is positioned between the first plate 640 and the second plate 644. In the illustrated embodiment, the wedge member 648 is a single unitary member that tapers from a first end 700 to a second end 704. Similar to the wedge member 48 of FIGS. 1-4, the illustrated wedge member 648 has a taper angle between about 1° to about 5°. The wedge member 648 includes an outwardly extending finger 708 adjacent to the second end 704 and a lip 712 formed on the first end 700. The finger 708 and the lip 712 provide physical stops to limit the range of rotation of the ring member 652 relative to the wedge member 648.

Figure 13:
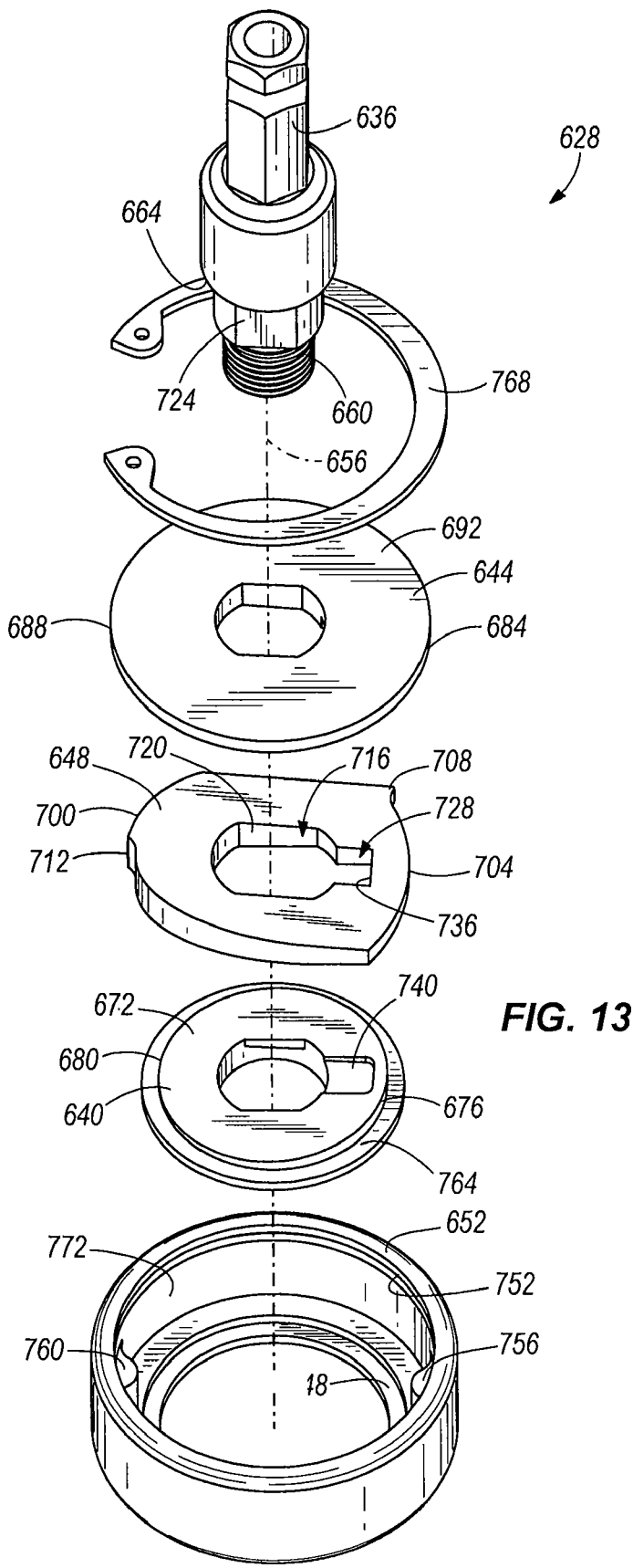
FIG. 13 is an exploded perspective view of still another arbor assembly embodying the invention.
Figure 16:
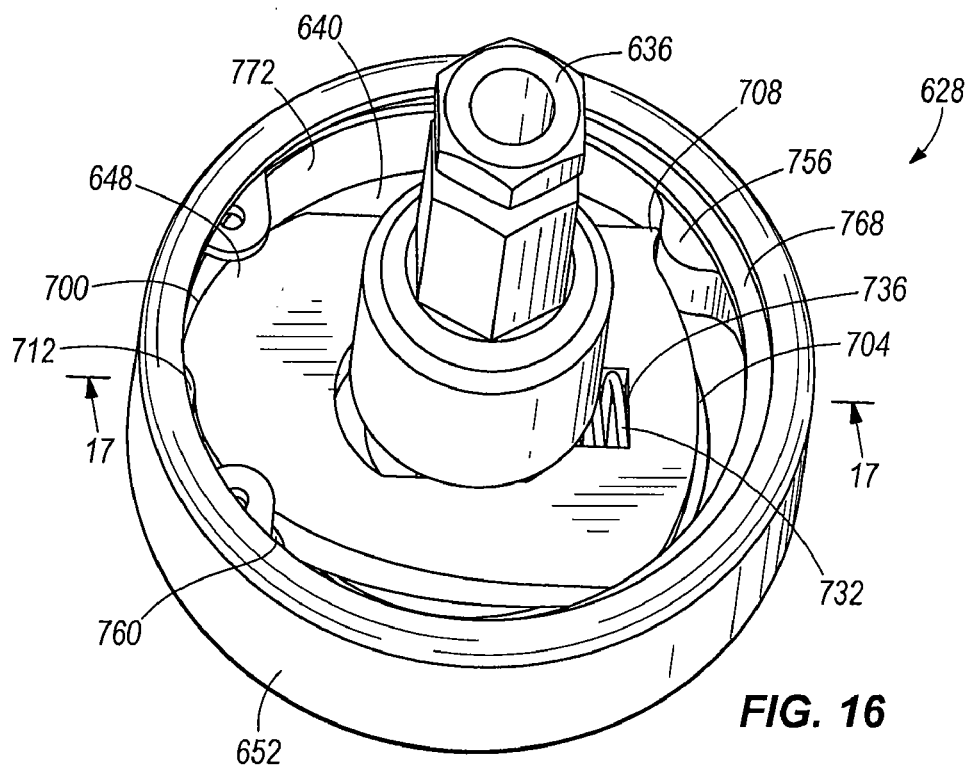
FIG. 16 is a bottom perspective view of the arbor assembly of FIG. 13, including the wedge member in a collapsed position.

As shown in FIG. 13, the wedge member 648 defines a central opening 716 to receive the shaft 636. The opening 716 is generally larger than an outer circumference of the shaft 636 such that the wedge member 648 can move transverse relative to the shaft 636 and the plates 640, 644 between a first, or extended, position (FIGS. 14 and 15) and a second, or collapsed, position (FIGS. 16 and 17). In the illustrated embodiment, the opening 716 is partially defined by two planar, inner sidewalls 720. The planar sidewalls 720 correspond to flattened surface portions 724 on the shaft 636 to inhibit rotation of the wedge member 648 relative to the shaft 636.

The opening 716 also includes a generally rectangular cutout portion 728 extending radially outward. As shown in FIGS. 14-17, the cutout portion 728 receives a biasing member 732 positioned between a portion of the shaft 636 and an inner surface 736 of the wedge member 648. The first plate 640 and the second plate 644 include corresponding cutout portions 740, 744 to provide additional clearance for the biasing member 732. In the illustrated embodiment, the biasing member 732 is a coil spring. In other embodiments, other suitable elastomeric members may also or alternatively be employed. The biasing member 732 biases the wedge member 648 relative to the plates 640, 644 in a second direction B generally perpendicular to the longitudinal axis 656 and toward the extended position.

The ring member 652, or actuator, substantially surrounds the first plate 640, the second plate 644, and the wedge member 648. As shown in FIG. 13, the ring member 652 includes an inwardly extending flange 748, a groove 752, a first projection 756, and a second projection 760. The flange 748 engages an outer lip 764 of the first plate 640 to limit the range of movement of the first plate 640 along the shaft 636, prohibiting the plate 640 from sliding off of the shaft 636. The groove 752 receives a snap ring 768 that engages the first surface 692 of the second plate 644 to limit linear movement of the ring member 652 along the longitudinal axis 656 relative to the plates 640, 644 and the wedge member 648. The snap ring 768 is removable from the groove 752, allowing the ring member 652 to be removed for cleaning, lubricating, or otherwise servicing the arbor assembly 628.

The first and second projections 756, 760 are formed on an inner surface 772 of the ring member 652 and extend toward the longitudinal axis 656. The first projection 756 is positioned to engage the second end 704 of the wedge member 648 and the second projection 760 is positioned to engage the first end 700 of the wedge member 648. The projections 756, 760 push the wedge member 648 between the extended position (FIGS. 14 and 15) and the collapsed position (FIGS. 16 and 17) depending on where each projection 756, 760 engages the wedge member 648. For example, the first projection 756 generally pushes the wedge member 648 in a third direction C, while the second projection 760 generally pushes the wedge member 648 in the second direction B. Rotating the ring member 652 relative to the wedge member 648 adjusts the positions of the projections 756, 760 relative to the wedge member 648, thereby moving the wedge member 648 between the extended and collapsed positions.

Figure 14:
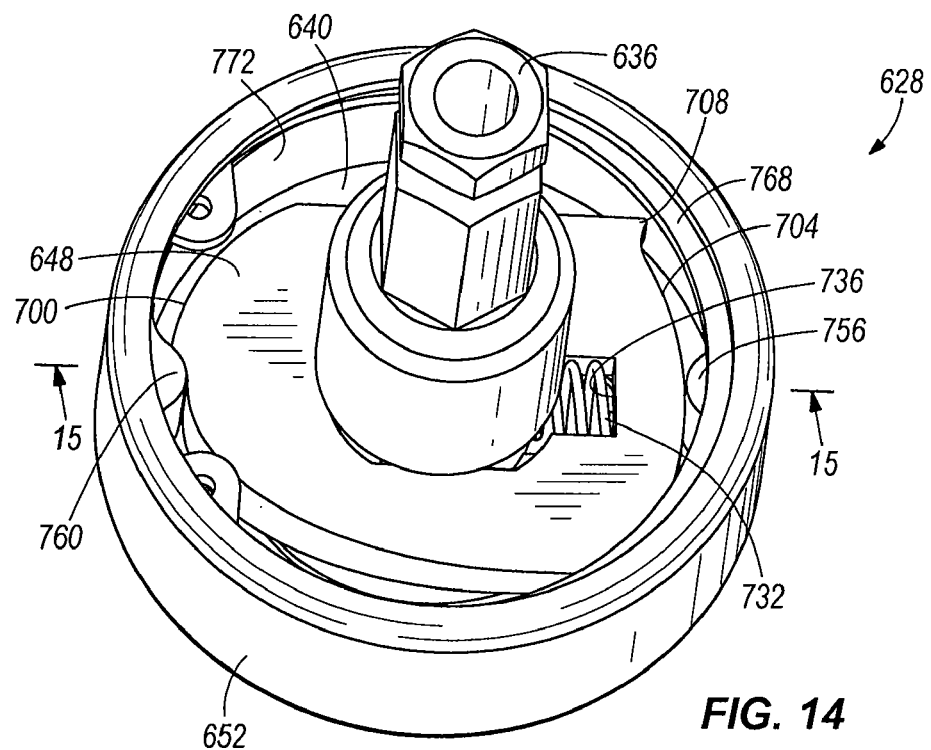
FIG. 14 is a bottom perspective view of the arbor assembly of FIG. 13, including a wedge member in an extended position.

As shown in FIGS. 14 and 15, the ring member 652 is oriented such that the first projection 756 is spaced apart from the finger 708 of the wedge member 648 and the second projection 760 is adjacent to the lip 712 (FIG. 13) of the wedge member 648. In such an orientation, the second projection 760 pushes the wedge member 648 in the second direction B (to the right in FIG. 15) toward the extended position. The first projection 756 is generally aligned with a less wide portion on the second end 704 of the wedge member 648 such that the first projection 756 does not interfere with movement of the wedge member 648 to the extended position.

As shown in FIGS. 16 and 17, the ring member 652 is oriented such that the first projection 756 is adjacent to the finger 708 of the wedge member 648 and the second projection 760 is spaced apart from the lip 712 of the wedge member 648. In such an orientation, the first projection 756 pushes the wedge member 648 in the third direction C (to the left in FIG. 17) toward the collapsed position. The second projection 760 is generally aligned with a less wide portion on the first end 700 of the wedge member 648 such that the second projection 760 does not interfere with movement of the wedge member 648 to the collapsed position.

In the illustrated embodiment, the biasing member 732 provides sufficient force to hold the wedge member 648, and thereby the ring member 652, in the extended position (FIGS. 14 and 15). Such an arrangement limits unintentional movement of the wedge member 648 from the extended position to the collapsed position (FIGS. 16 and 17). In other embodiments, the arbor assembly 628 may additionally or alternatively include a torsion spring to bias the ring member 652, and thereby the wedge member 648, from the collapsed position to the extended position.

To relieve pressure between threads on a cutting tool and the threaded portion 660 of the shaft 636 after a cutting operation, a user rotates the ring member 652 from the orientation shown in FIGS. 14 and 15 to the orientation shown in FIGS. 16 and 17. As the ring member 652 rotates, the first projection 756 moves toward the finger 708 and the second projection 760 moves away from the lip 712. The first projection 756 thereby engages the second end 704 of the wedge member 648 to move the wedge member 648 relative to the first and second plates 640, 644 in the third direction C from the extended position (FIGS. 14 and 15) to the collapsed position (FIGS. 16 and 17). Pressure from the cutting tool on the first surface 668 of the first plate 640 pushes the first plate 640 in the first direction A (upward in FIG. 15) away from the threaded portion 660 of the shaft 636 and the cutting tool. This movement relieves the pressure between the threads of the cutting tool and the threaded portion 660 of the shaft 636 such that the user may then unthread the cutting tool from the arbor assembly 628 by hand.

Once the cutting tool is disconnected from the arbor assembly 628, the ring member 652 is rotated back to the orientation shown in FIGS. 14 and 15. As the ring member 652 rotates, the first projection 756 moves away from the finger 708 and the second projection 760 moves toward the lip 712. The second projection 760 thereby engages the first end 700 of the wedge member 648 to move the wedge member 648 relative to the first and second plates 640, 644 in the second direction B from the collapsed position to the extended position. As the wedge member 648 moves, the wedge member 648 pushes the first plate 640 back toward the threaded portion 660 of the shaft 636 (downward in FIG. 17).

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. An arbor assembly for connecting a cutting tool to a power tool, the arbor assembly comprising:
   a shaft defining a longitudinal axis and including an end portion configured to couple to the cutting tool;
   a plate surrounding a portion of the shaft adjacent to the end portion, the plate having a first surface configured to engage the cutting tool when the cutting tool is coupled to the shaft and a second surface substantially opposite the first surface, the plate movable along the longitudinal axis relative to the shaft; and
   a wedge member positioned adjacent to the second surface of the plate and defining an opening to receive a portion of the shaft, at least a portion of the wedge member being tapered such that a thickness of the wedge member decreases from a first end to a second end, the wedge member movable relative to the plate from a first position, in which the plate is inhibited from moving along the longitudinal axis away from the end portion, to a second position, in which the plate is movable along the longitudinal axis away from the end portion.

2. The arbor assembly of claim 1, wherein the wedge member moves from the first position to the second position in a direction substantially perpendicular to the longitudinal axis.

3. The arbor assembly of claim 1, wherein the opening is substantially larger than an outer circumference of the shaft.

4. The arbor assembly of claim 1, wherein the end portion of the shaft is threaded.

5. The arbor assembly of claim 1, wherein the plate is a first plate, and further comprising a second plate surrounding a portion of the shaft, wherein the second plate is positioned adjacent to a surface of the wedge member substantially opposite the first plate.

6. The arbor assembly of claim 1, further comprising a biasing member to bias the wedge member to the first position.

7. The arbor assembly of claim 6, wherein the opening includes a cutout portion between the wedge member and an outer surface of the shaft, and wherein the biasing member is positioned substantially within the cutout portion.

8. The arbor assembly of claim 1, further comprising an actuator coupled to the wedge member, and wherein the actuator is operable to move the wedge member from the first position to the second position.

9. The arbor assembly of claim 8, wherein the actuator is integrally formed as a single piece with the wedge member.

10. The arbor assembly of claim 8, wherein the actuator includes a cam engaging a portion of the wedge member, and wherein the cam is movable relative to the wedge member to move the wedge member from the first position to the second position.

11. The arbor assembly of claim 10, further comprising a second actuator coupled to the wedge member and including a second cam, wherein the second cam engages another portion of the wedge member, and wherein the second cam is movable relative to the wedge member to move the wedge member from the second position to the first position.

12. The arbor assembly of claim 8, wherein the actuator includes a ring member substantially surrounding the wedge member, and wherein the ring member is rotatable relative to the wedge member to move the wedge member from the first position to the second position.

13. The arbor assembly of claim 1, further comprising a blocking member coupled to the shaft, wherein the blocking member includes a pin engaging the wedge member to substantially inhibit movement of the wedge member from the first position to the second position, and wherein the blocking member is movable along the shaft relative to the wedge member to disengage the pin from the wedge member.

14. An arbor assembly for connecting a cutting tool to a power tool, the arbor assembly comprising:
   a shaft defining a longitudinal axis and having an end portion configured to couple to the cutting tool;
   a plate surrounding a portion of the shaft adjacent to the end portion, the plate having a first surface configured to engage the cutting tool when the cutting tool is coupled to the shaft and a second surface substantially opposite the first surface, the plate movable relative to the shaft in a first direction substantially parallel to the longitudinal axis;
   a wedge member adjacent to the second surface of the plate and defining an opening to receive a portion of the shaft, at least a portion of the wedge member being tapered such that a thickness of the wedge member decreases from a first end to a second end, the wedge member substantially inhibiting movement of the plate in the first direction away from the end portion; and
   an actuator coupled to the wedge member, the actuator operable to move the wedge member relative to the shaft and the plate in a second direction substantially perpendicular to the longitudinal axis, wherein movement of the wedge member in the second direction allows movement of the plate in the first direction.

15. The arbor assembly of claim 14, wherein the opening is substantially larger than an outer circumference of the shaft.

16. The arbor assembly of claim 14, wherein the end portion of the shaft is threaded.

17. The arbor assembly of claim 14, wherein the plate is a first plate, and further comprising a second plate surrounding a portion of the shaft, wherein the second plate is positioned adjacent to a surface of the wedge member substantially opposite the first plate.

18. The arbor assembly of claim 14, further comprising a biasing member to bias the wedge member in a third direction substantially opposite the second direction.

19. The arbor assembly of claim 18, wherein the opening includes a cutout portion between the wedge member and an outer surface of the shaft, and wherein the biasing member is positioned substantially within the cutout portion.

20. The arbor assembly of claim 14, wherein the actuator is integrally formed as a single piece with the wedge member.

21. The arbor assembly of claim 14, wherein the actuator includes a cam engaging a portion of the wedge member, and wherein the cam is movable relative to the wedge member to move the wedge member in the second direction.

22. The arbor assembly of claim 21, further comprising a second actuator coupled to the wedge member and including a second cam, wherein the second cam engages another portion of the wedge member, and wherein the second cam is movable relative to the wedge member to move the wedge member in a third direction substantially opposite the second direction.

23. The arbor assembly of claim 14, wherein the actuator includes a ring member substantially surrounding the wedge member, and wherein the ring member is rotatable relative to the wedge member to move the wedge member in the second direction.

24. The arbor assembly of claim 14, further comprising a blocking member coupled to the shaft, wherein the blocking member includes a pin engaging the wedge member to substantially inhibit movement of the wedge member in the second direction, and wherein the blocking member is movable along the shaft relative to the wedge member to disengage the pin from the wedge member.

25. A cutting tool assembly comprising:
   a cutting tool; and
   an arbor assembly including
      a shaft defining a longitudinal axis and having an end portion coupled to the cutting tool,
      a first plate substantially surrounding a portion of the shaft adjacent to the end portion, the first plate having a first surface engaging the cutting tool and a second surface substantially opposite the first surface, the first plate movable along the longitudinal axis relative to the shaft,
      a second plate spaced apart from the first plate and surrounding a portion of the shaft, the second plate having a first surface facing away from the first plate and a second surface substantially opposite the first surface,
      a wedge member positioned between the second surface of the first plate and the second surface of the second plate and defining an opening to receive a portion of the shaft, at least a portion of the wedge member being tapered such that a thickness of the wedge member decreases from a first end to a second end, the wedge member movable relative to the first plate and the second plate from a first position, in which the first plate is inhibited from moving along the longitudinal axis away from the cutting tool, to a second position, in which the first plate is movable along the longitudinal axis away from the cutting tool, and
      an actuator coupled to the wedge member, the actuator operable to move the wedge member from the first position to the second position.

26. The cutting tool assembly of claim 25, wherein the wedge member moves from the first position to the second position in a direction substantially perpendicular to the longitudinal axis.

27. The cutting tool assembly of claim 25, wherein the opening is substantially larger than an outer circumference of the shaft.

28. The cutting tool assembly of claim 25, wherein the end portion of the shaft is threaded.

29. The cutting tool assembly of claim 25, further comprising a biasing member to bias the wedge member to the first position, and wherein the actuator is operable to move the wedge member to the second position against the bias of the biasing member.

30. The cutting tool assembly of claim 25, wherein the actuator is integrally formed as a single piece with the wedge member.

31. The cutting tool assembly of claim 25, wherein the actuator includes a first cam engaging a first portion of the wedge member, and further comprising a second actuator coupled to the wedge member and including a second cam engaging a second portion of the wedge member, wherein the first cam is movable relative to the wedge member to move the wedge member from the first position to the second position, and wherein the second cam is movable relative to the wedge member to move the wedge member from the second position to the first position.

32. The cutting tool assembly of claim 25, wherein the actuator includes a ring member substantially surrounding the first plate, the second plate, and the wedge member, and wherein the ring member is rotatable relative to the wedge member to move the wedge member from the first position to the second position.

33. The cutting tool assembly of claim 25, wherein the arbor assembly further includes a blocking member coupled to the shaft, wherein the blocking member includes a pin engaging the wedge member to substantially inhibit movement of the wedge member from the first position to the second position, and wherein the blocking member is movable along the shaft relative to the wedge member to disengage the pin from the wedge member.

34. The cutting tool assembly of claim 25, wherein the cutting tool is a hole saw.

* * * * *